(12) United States Patent
Chen et al.

(10) Patent No.: US 9,001,293 B2
(45) Date of Patent: Apr. 7, 2015

(54) DISPLAY DEVICE AND COLOR FILTER SUBSTRATE THEREOF

(71) Applicant: AU Optronics Corp., Hsin-Chu (TW)

(72) Inventors: Kuei-Bai Chen, Hsin-Chu (TW);
Shiuan-Fu Lin, Hsin-Chu (TW);
Shiang-Lin Lian, Hsin-Chu (TW);
Chen-Hsien Liao, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 151 days.

(21) Appl. No.: 13/925,846

(22) Filed: Jun. 25, 2013

(65) Prior Publication Data

US 2014/0139793 A1 May 22, 2014

(30) Foreign Application Priority Data

Nov. 20, 2012 (TW) .............................. 101143243 A

(51) Int. Cl.
*G02F 1/1335* (2006.01)
*G02F 1/1333* (2006.01)
*G02B 5/20* (2006.01)

(52) U.S. Cl.
CPC ............ *G02F 1/133514* (2013.01); *G02B 5/20* (2013.01); *G02B 5/201* (2013.01)

(58) Field of Classification Search
CPC ................. G02F 1/133514; G02F 1/133512; G02F 1/133516; G02F 1/133555; G02F 1/1333; G02F 1/33305; G02F 1/133351; G02B 5/201; G02B 26/008; G02B 7/006; G02B 26/007
USPC ........................... 349/106, 158; 359/891, 892
See application file for complete search history.

(56) References Cited

U.S. PATENT DOCUMENTS

| | | | | |
|---|---|---|---|---|
| 6,589,330 | B2 * | 7/2003 | Kato et al. ..................... | 106/413 |
| 2009/0027603 | A1 * | 1/2009 | Samulski et al. ............. | 349/124 |

* cited by examiner

*Primary Examiner* — Mike Qi
(74) *Attorney, Agent, or Firm* — Winston Hsu; Scott Margo

(57) ABSTRACT

A display device and color filter substrate thereof are provided. The color filter substrate includes a substrate and a green color filter disposed on the substrate. A concentration of halogen in the green color filter is less than 10 ppm. The green color filter has a transmittance spectrum $G(\lambda)$, and $CMF\_Z(\lambda)$ is the color matching function defined by International Commission on Illumination (CIE). A peak intensity between 380 nm and 780 nm of $G(\lambda) \times CMF\_Z(\lambda)$ is in a range between 0.33 and 0.4.

16 Claims, 5 Drawing Sheets

DISPLAY DEVICE AND COLOR FILTER SUBSTRATE THEREOF

BACKGROUND OF THE INVENTION

1. Field of the Invention

The present invention relates to a display device and a color filter substrate thereof, and more particularly, to a display device and a color filter substrate including a halogen-free green color filter.

2. Description of the Prior Art

Liquid crystal display panels have been widely used in electronic products such as smart phones, notebook PCs and tablet PCs because of the properties of compact and lightweight. The liquid crystal display panel is a non-self-luminous display panel, a backlight module is required to provide a light source, and a color filter is required to colorize lights from the light source.

The color filter includes a red color filter, a green color filter, and a blue color filter. A red light, a green light, and a blue light are generated after the lights from the light source pass through the color filter. The red light, the green light, and the blue light may be mixed to present full color display images. The liquid crystal display panel may present display images with high color saturation when the color filter has great color filtering performance. High transmittance is another demand on the color filter for considerations on high luminance.

The whole transmittance of the color filter is manly dominated by the transmittance of the green color filter. Generally, the transmittance of the green color filter influences more than 70% of the whole transmittance of the color filter. For demands on great color filtering performance and high transmittance, the conventional green color filters with high halogen content, such as chlorine and bromine, are commonly used. However, for environmental protection concern, the concentration of halogen in color filters has to be as low as possible, and that is a problem for choosing the materials of color filters.

SUMMARY OF THE INVENTION

One of the objectives of the present invention is to provide a display device and a color filter substrate made of a halogen-free green color filter.

To achieve the purposes described above, an embodiment of the present invention provides a color filter substrate. The color filter substrate includes a substrate and a green color filter disposed on the substrate. A concentration of halogen in the green color filter is less than 10 ppm. The green color filter has a transmittance spectrum $G(\lambda)$, and $CMF\_Z(\lambda)$ is the color matching function defined by International Commission on Illumination (CIE). A peak intensity between 380 nm and 780 nm of $G(\lambda) \times CMF\_Z(\lambda)$ is in a range between 0.33 and 0.4.

To achieve the purposes described above, an embodiment of the present invention provides a display device. The display device includes a non-self-luminous display panel and at least one light-emitting device. The non-self-luminous display panel includes a color filter substrate, and the color filter substrate includes a substrate and a green color filter disposed on the substrate. A concentration of halogen in the green color filter is less than 10 ppm. The green color filter has a transmittance spectrum $G(\lambda)$, and $CMF\_Z(\lambda)$ is the color matching function defined by International Commission on Illumination (CIE). A peak intensity between 380 nm and 780 nm of $G(\lambda) \times CMF\_Z(\lambda)$ is in a range between 0.33 and 0.4. The light-emitting device is configured to provide a white light to the non-self-luminous display panel.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, embodiments are detailed as follows. The embodiments of the present invention are illustrated in the accompanying drawings with numbered elements to clarify the contents and effects to be achieved.

Figure 1:
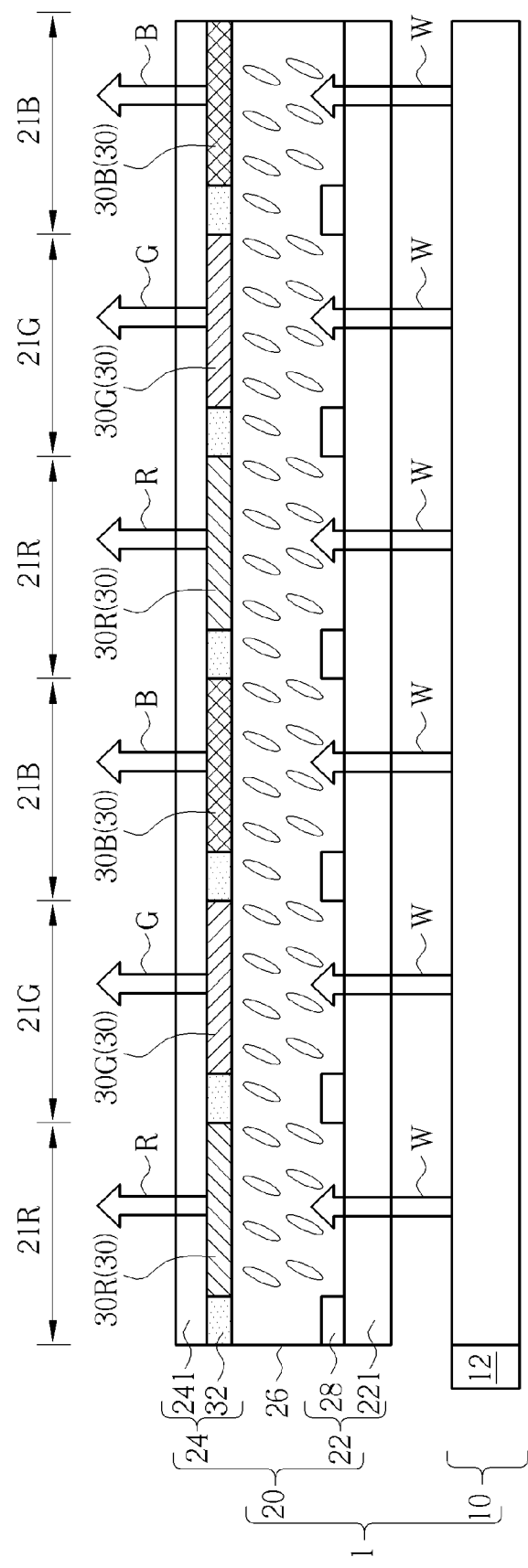
FIG. 1 is a schematic diagram illustrating a display device of the present invention.

Please refer to FIG. 1. FIG. 1 is a schematic diagram illustrating a display device of the present invention. In this embodiment, the display device is a non-self-luminous display device, such as a liquid crystal display device, but not limited thereto. The display device in this embodiment may also be other appropriate display devices. As shown in FIG. 1, a display device 1 in this embodiment includes a backlight module 10 and a non-self-luminous display panel 20. The backlight module 10 is disposed under the non-self-luminous display panel 20, and the backlight module 10 includes at least one light-emitting device 12 configured to provide a white light W to the display panel 20. The light-emitting device 12 may be a cold cathode fluorescent lamp (CCFL), a light emitting diode (LED), or other appropriate light-emitting device. The non-self-luminous display panel 20 in this embodiment is a liquid crystal display panel, but not limited thereto. In this embodiment, the non-self-luminous display panel 20 includes an array substrate 22, a color filter substrate 24, a plurality of red sub-pixels 21R, a plurality of green sub-pixels 21G, a plurality of blue sub-pixels 21B, and a display medium layer 26. The array substrate 22 and the color filter substrate 24 are disposed oppositely to each other. The display medium layer 26, such as a liquid crystal layer, is disposed between the array substrate 22 and the color filter substrate 24. The array substrate 22 includes a substrate 221 and a plurality of active switching units 28, and the active switching units 28 may be thin film transistors disposed on the substrate 221. The active switching units 28 are respectively disposed in each red sub-pixel 21R, each green sub-pixel 21G, and each blue sub-pixel 21B. The color filter substrate 24 includes a substrate 241, a patterned color filter layer 30 and a patterned light-shielding layer 32. The pattern color filter layer 30 and the patterned light-shielding layer 32 are disposed on the substrate 241. The patterned color filter layer 30 includes a red color filter 30R disposed in the red sub-pixel 21R, a green color filter 30G disposed in the green sub-pixel 21G, and a blue color filter 30B disposed in the blue sub-pixel 21B. The red color filter 30R is configured to covert the white light W into a red light R after the white light W passes through the red color filter 30R. The green color filter 30G is configured to covert the white light W into a green light G after the white light W passes through the green color filter 30G. The blue color filter 30B is configured to covert the white light W into a blue light B after the white light W passes through the blue color filter 30B. The red light R, the green light G, and the blue light B irradiating from the patterned color filter layer 30 may be used to present full color display images. The patterned light-shielding pattern 32, such as a black matrix, is disposed between adjacent color filter layers so as to block light leakage. In another exemplary embodiment of the present invention, the pattern color filter layer 30 and/or the patterned light-shielding layer 32 may also be disposed on the array substrate 22. The non-self-luminous display panel 20 may further include display units (not shown), such as gate lines, data lines, pixel electrodes, common electrodes, capacitance storage lines, capacitance storages, alignment films, and polarizing layers. The allocations and functions of the display units mentioned above are well-known to people with ordinary skills in the category of the present invention and will not be redundantly described.

In this embodiment, the white light W provided by the backlight module 10 may be C-light. The C-light is a light source having a correlated color temperature (CCT) about 6,774K.

Figure 2:
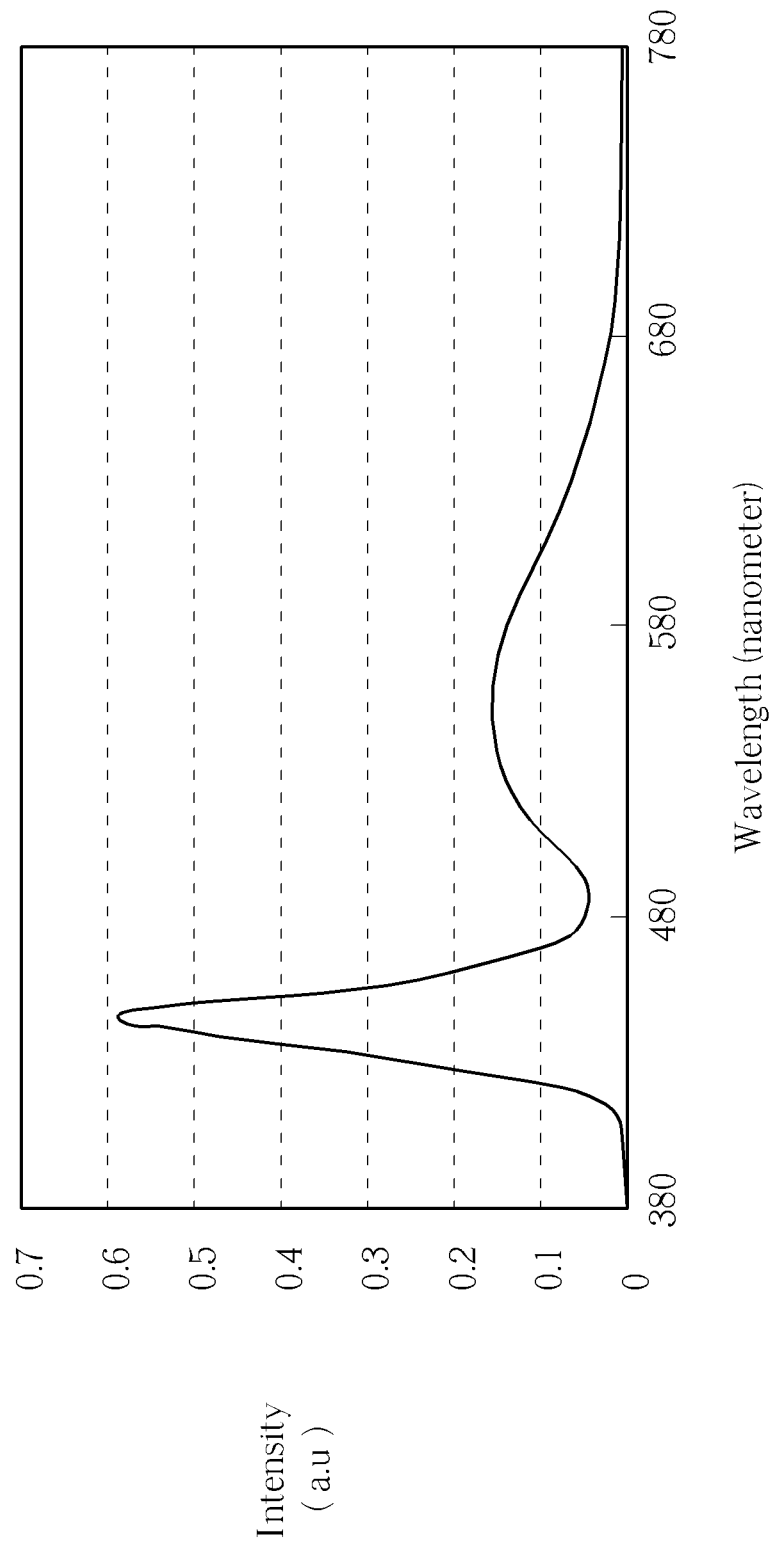
FIG. 2 is a schematic diagram illustrating a spectrum of a white light provided by a yellow phosphor series light emitting diode device.

In another exemplary embodiment, the light-emitting device 12 in the backlight module 10 may include a yellow phosphor series LED device, and the white light W may be provided by the yellow phosphor series LED device. The yellow phosphor series LED device essentially consists of a blue LED and yellow phosphor powders, and the yellow phosphor series LED device is capable of providing the white light W. Please refer to FIG. 2. FIG. 2 is a schematic diagram illustrating a spectrum of the white light provided by the yellow phosphor series LED device. As shown in FIG. 2, the spectrum of the white light provided by the yellow phosphor series LED device has a peak at 445 nm and has another peak at 556 nm.

In this embodiment, materials of the green color filter 30G include a mixture of a green pigment and a yellow pigment. For example, the green pigment may include an azo metal complex series green pigment (as shown in the chemical formula (1) listed below) and a phthalocyanine series green pigment (as shown in the chemical formula (2) listed below). The yellow pigment may include an azo metal complex series yellow pigment (as shown in the chemical formula (3) listed below).

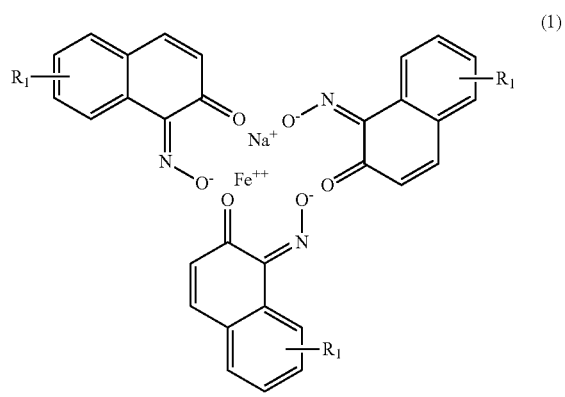

In the chemical formula (1), $R_1$ stands for a substituent group, and the substituent group $R_1$ may include an alkyl chain such as a methyl group ($CH_3$), or an ethyl group ($C_2H_5$), naphthalene, a cyano-group (CN), an oxyalkyl chain such as a methoxy group ($OCH_3$), or an ester group such as methoxycarbonyl group ($OCOCH_3$).

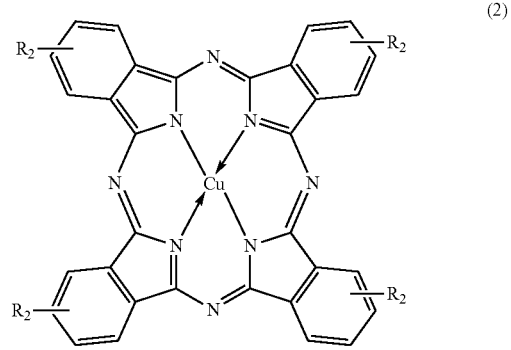

In the chemical formula (2), $R_2$ stands for a substituent group, and the substituent group $R_2$ may include an alkyl chain such as a methyl group ($CH_3$), or an ethyl group ($C_2H_5$), naphthalene, a cyano-group (CN), an oxyalkyl chain such as a methoxy group ($OCH_3$), or an ester group such as methoxycarbonyl group ($OCOCH_3$).

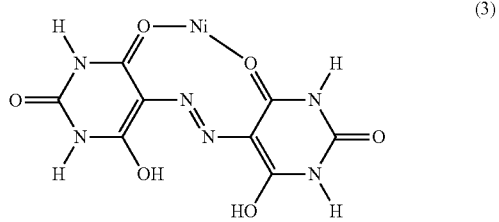

In this embodiment, the materials of the green color filter 30G may include a mixture of the azo metal complex series green pigment and the azo metal complex series yellow pigment, or the green color filter 30G may essentially consist of the mixture of the azo metal complex series green pigment and the azo metal complex series yellow pigment. Additionally, the materials of the green color filter 30G may include a mixture of the phthalocyanine series green pigment and the azo metal complex series yellow pigment, or the green color filter 30G may essentially consist of the mixture of the phthalocyanine series green pigment and the azo metal complex series yellow pigment. In the mixtures described above, a component ratio of the green pigment is substantially between 0.68 and 0.69, and a component ratio of the yellow pigment is substantially between 0.31 and 0.32.

Please refer to Table 1 and Table 2. Table 1 shows green point chromaticity coordinates (Gx, Gy) of the light generated from the C-light source and passing through the green color filters with different component ratios of the green pigment and the yellow pigment. Table 2 shows green point chromaticity coordinates (Gx, Gy) of the light generated from the yellow phosphor series LED device and passing through the green color filters with different component ratios of the green pigment and the yellow pigment.

TABLE 1

| | Gx | Gy | Component ratio of the green pigment | Component ratio of the yellow pigment |
|---|---|---|---|---|
| Sample 1 | 0.270 | 0.577 | 0.683 | 0.317 |
| Sample 2 | 0.267 | 0.581 | 0.687 | 0.313 |
| Sample 3 | 0.264 | 0.587 | 0.689 | 0.311 |

As shown in Table 1, when the component ratio of the green pigment is substantially between 0.68 and 0.69, the white light generated from the C-light source has a green point chromaticity coordinates (Gx, Gy) after passing through the green color filter, where Gx and Gy may be substantially allocated within following ranges: $0.264 < Gx < 0.27$, and $0.577 < Gy < 0.587$.

TABLE 2

| | Gx | Gy | Component ratio of the green pigment | Component ratio of the yellow pigment |
|---|---|---|---|---|
| Sample 1 | 0.299 | 0.612 | 0.683 | 0.317 |
| Sample 2 | 0.297 | 0.617 | 0.687 | 0.313 |
| Sample 3 | 0.294 | 0.625 | 0.689 | 0.311 |

As shown in Table 2, when the component ratio of the green pigment is substantially between 0.68 and 0.69, the white light generated from the yellow powder LED device has a green point chromaticity coordinates (Gx, Gy) after passing through the green color filter, where Gx and Gy may be substantially allocated within following ranges: $0.294 < Gx < 0.299$, and $0.612 < Gy < 0.625$.

In this embodiment, a concentration of halogen in the green color filter 30G is substantially less than 10 ppm. The green color filter has a transmittance spectrum $G(\lambda)$, and $CMF\_Z(\lambda)$ is the color matching function defined by International Commission on Illumination (CIE). A peak intensity between 380 nm and 780 nm of $G(\lambda) \times CMF\_Z(\lambda)$ is in a range between 0.33 and 0.4.

Figure 3:
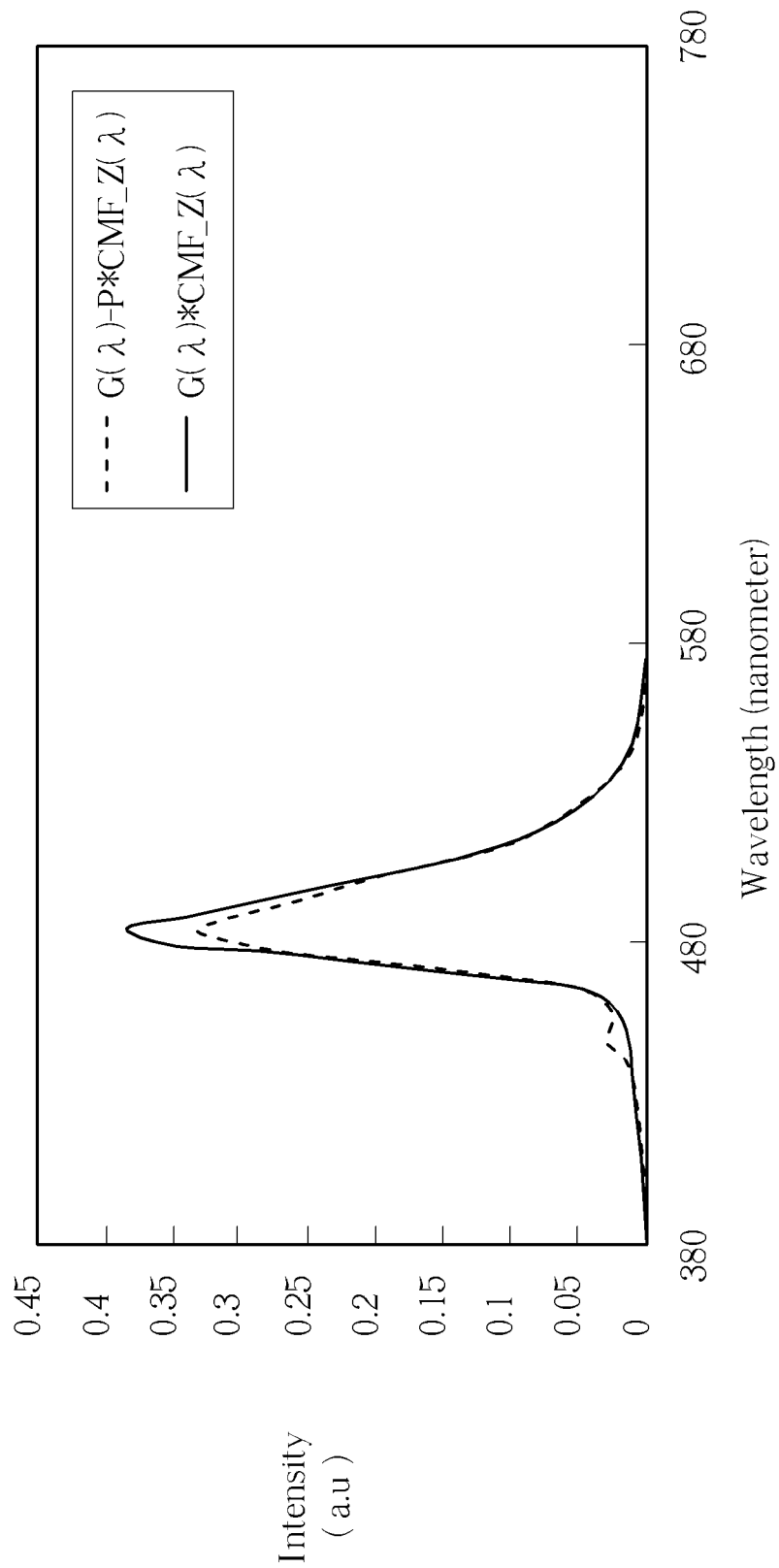
FIG. 3 is a schematic diagram illustrating a relationship between $G(\lambda) \times CMF\_Z(\lambda)$ and $G(\lambda)-P \times CMF\_Z(\lambda)$, in which $G(\lambda)$ stands for a transmittance spectrum of a green color filter in sample 1 of this embodiment, $CMF\_Z(\lambda)$ stands for the color matching function, and $G(\lambda)-P$ stands for a transmittance spectrum of a green color filter in a comparison embodiment.
Figure 4:
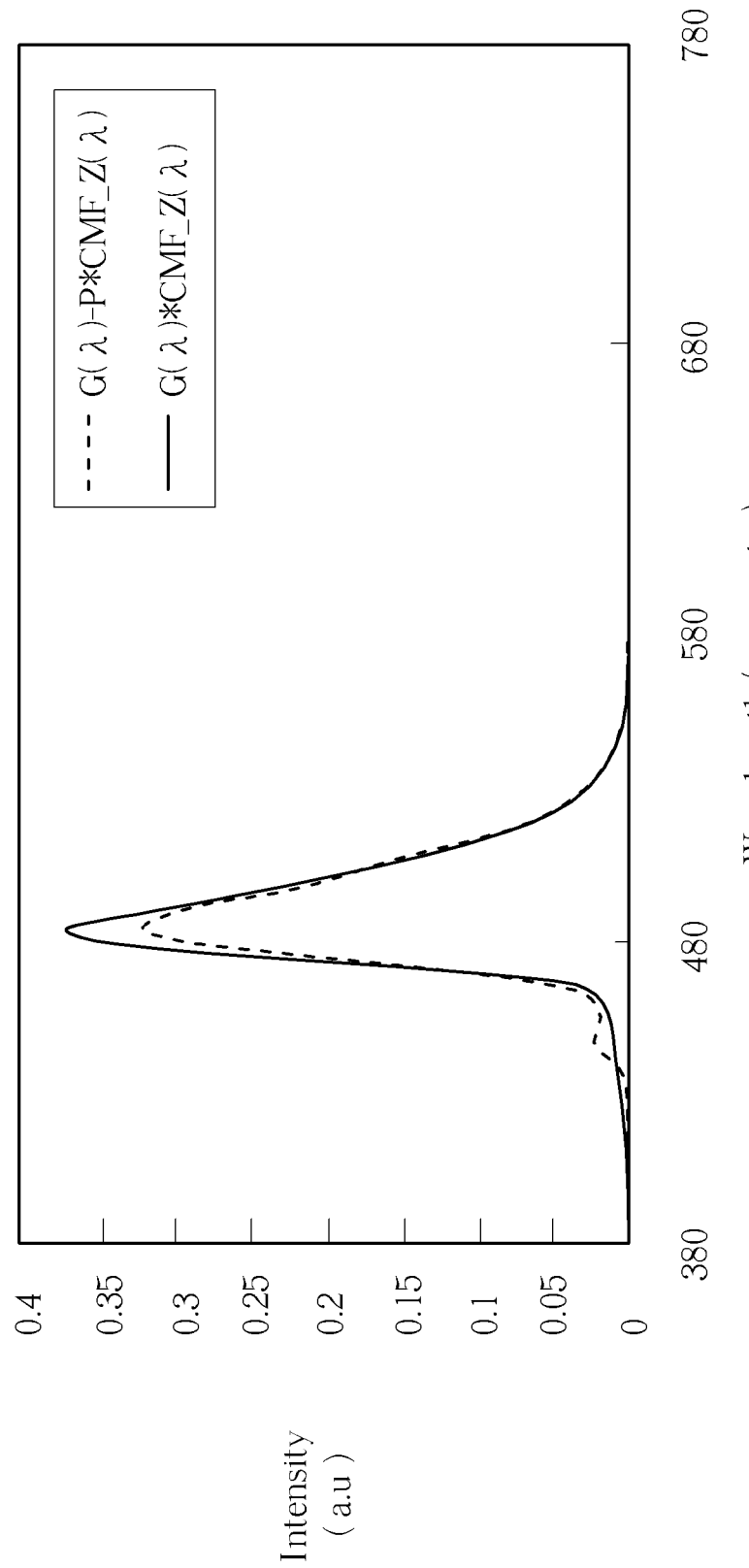
FIG. 4 is a schematic diagram illustrating a relationship between $G(\lambda) \times CMF\_Z(\lambda)$ and $G(\lambda)-P \times CMF\_Z(\lambda)$, in which $G(\lambda)$ stands for a transmittance spectrum of a green color filter in sample 2 of this embodiment, $CMF\_Z(\lambda)$ stands for the color matching function, and $G(\lambda)-P$ stands for a transmittance spectrum of a green color filter in a comparison embodiment.
Figure 5:
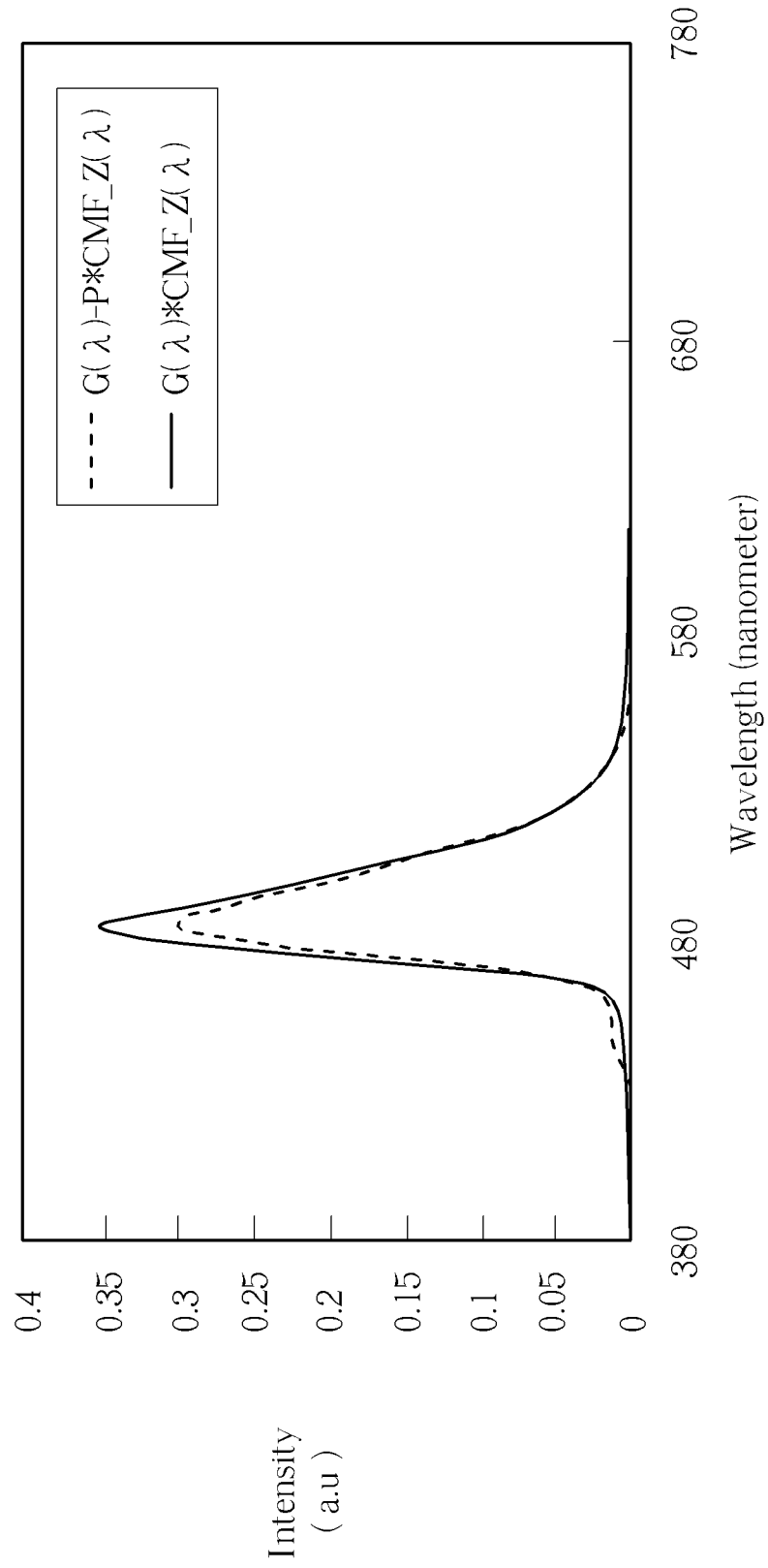
FIG. 5 is a schematic diagram illustrating a relationship between $G(\lambda) \times CMF\_Z(\lambda)$ and $G(\lambda)-P \times CMF\_Z(\lambda)$, in which $G(\lambda)$ stands for a transmittance spectrum of a green color filter in sample 3 of this embodiment, $CMF\_Z(\lambda)$ stands for the color matching function, and $G(\lambda)-P$ stands for a transmittance spectrum of a green color filter in a comparison embodiment.

Please refer to FIGS. 3-5. FIG. 3 is a schematic diagram illustrating a relationship between $G(\lambda) \times CMF\_Z(\lambda)$ and $G(\lambda) - P \times CMF\_Z(\lambda)$, in which $G(\lambda)$ stands for a transmittance spectrum of a green color filter in sample 1 of this embodiment, $CMF\_Z(\lambda)$ stands for the color matching function, and $G(\lambda) - P$ stands for a transmittance spectrum of a green color filter in a comparison embodiment. FIG. 4 is a schematic diagram illustrating a relationship between $G(\lambda) \times CMF\_Z(\lambda)$ and $G(\lambda) - P \times CMF\_Z(\lambda)$, in which $G(\lambda)$ stands for a transmittance spectrum of a green color filter in sample 2 of this embodiment, and $G(\lambda) - P$ stands for a transmittance spectrum of a green color filter in a comparison embodiment. FIG. 5 is a schematic diagram illustrating a relationship between $G(\lambda) \times CMF\_Z(\lambda)$ and $G(\lambda) - P \times CMF\_Z(\lambda)$, in which $G(\lambda)$ stands for a transmittance spectrum of a green color filter in sample 3 of this embodiment, and $G(\lambda) - P$ stands for a transmittance spectrum of a green color filter in a comparison embodiment. In the comparison embodiments, the material of the green color filter is a mixture of C.I. (color index) Pigment Green 36 and C.I. Pigment Yellow 150, and a concentration of halogen in this green color filter is much higher than 10 ppm. As shown in FIG. 3, a peak intensity between 380 nm and 780 nm of $G(\lambda) \times CMF\_Z(\lambda)$ in the sample 1 of this embodiment is about 0.380, and a peak intensity between 380 nm and 780 nm of $G(\lambda) - P \times CMF\_Z(\lambda)$ in the comparison embodiment is about 0.330. As shown in FIG. 4, a peak intensity between 380 nm and 780 nm of $G(\lambda) \times CMF\_Z(\lambda)$ in the sample 2 of this embodiment is about 0.375, and a peak intensity between 380 nm and 780 nm of $G(\lambda) - P \times CMF\_Z(\lambda)$ in the comparison embodiment is about 0.325. As shown in FIG. 5, a peak intensity between 380 nm and 780 nm of $G(\lambda) \times CMF\_Z(\lambda)$ in the sample 3 of this embodiment is about 0.361, and a peak intensity between 380 nm and 780 nm of $G(\lambda) - P \times CMF\_Z(\lambda)$ in the comparison embodiment is about 0.304.

According to the results described above, in the green color filters with high halogen content of the comparison embodiments, the peak intensities between 380 nm and 780 nm of $G(\lambda) - P \times CMF\_Z(\lambda)$ are lower than 0.33. However, in the green color filter with halogen concentration less than 10 ppm of this embodiment, the peak intensity between 380 nm and 780 nm of $G(\lambda) \times CMF\_Z(\lambda)$ is in a range between 0.33 and 0.4. In other words, the transmittance of the green color filter in this embodiment is better.

To summarize the above descriptions, the halogen-free green color filter is applied in the display device and the color filter substrate of this invention. Not only the environmental protection specification about the halogen content may be satisfied, but the whole transmittance of the color filter may also be enhanced because the transmittance of the halogen-free green color filter in this invention is improved too.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A color filter substrate, comprising:
   a substrate; and
   a green color filter, disposed on the substrate, wherein a concentration of halogen in the green color filter is less than 10 ppm, the green color filter has a transmittance spectrum $G(\lambda)$, $CMF\_Z(\lambda)$ is the color matching function defined by International Commission on Illumination (CIE), and a peak intensity between 380 nm and 780 nm of $G(\lambda) \times CMF\_Z(\lambda)$ is in a range between 0.33 and 0.4.

2. The color filter substrate of claim 1, wherein materials of the green color filter comprise a mixture of a green pigment and a yellow pigment.

3. The color filter substrate of claim 2, wherein the green pigment comprises an azo metal complex series green pigment or a phthalocyanine series green pigment.

4. The color filter substrate of claim 2, wherein the yellow pigment comprises an azo metal complex series yellow pigment.

5. The color filter substrate of claim 2, wherein a component ratio of the green pigment in the mixture is substantially in a range between 0.68 and 0.69.

6. The color filter substrate of claim 1, further comprising a red color filter and a blue color filter disposed on the substrate.

7. A display device, comprising:
- a non-self-luminous display panel, comprising a color filter substrate, the color filter substrate comprising:
  - a substrate; and
  - a green color filter, disposed on the substrate, wherein a concentration of halogen in the green color filter is less than 10 ppm, the green color filter has a transmittance spectrum $G(\lambda)$, $CMF\_Z(\lambda)$ is the color matching function defined by International Commission on Illumination (CIE), and a peak intensity between 380 nm and 780 nm of $G(\lambda) \times CMF\_Z(\lambda)$ is in a range between 0.33 to 0.4; and
- at least one light-emitting device, configured to provide a white light to the non-self-luminous display panel.

8. The display device of claim 7, wherein materials of the green color filter comprise a mixture of a green pigment and a yellow pigment.

9. The display device of claim 8, wherein the green pigment comprises an azo metal complex series green pigment or a phthalocyanine series green pigment.

10. The display device of claim 8, wherein the yellow pigment comprises an azo metal complex series yellow pigment.

11. The display device of claim 8, wherein a component ratio of the green pigment in the mixture is substantially in a range between 0.68 and 0.69.

12. The display device of claim 7, wherein the color filter substrate further comprises a red color filter and a blue color filter disposed on the substrate.

13. The display device of claim 7, wherein the white light is C-light.

14. The display device of claim 13, wherein the white light has green point chromaticity coordinates (Gx, Gy) after passing through the green color filter, wherein 0.264<Gx<0.27, and 0.577<Gy<0.587.

15. The display device of claim 7, wherein the light-emitting device comprises a yellow phosphor series light emitting diode (LED) device.

16. The display device of claim 15, wherein the white light has green point chromaticity coordinates (Gx, Gy) after passing through the green color filter, wherein 0.294<Gx<0.299, and 0.612<Gy<0.625.

* * * * *